July 12, 1955
L. A. MARTIN
2,712,719
LAWN EDGER
Filed Jan. 9, 1953
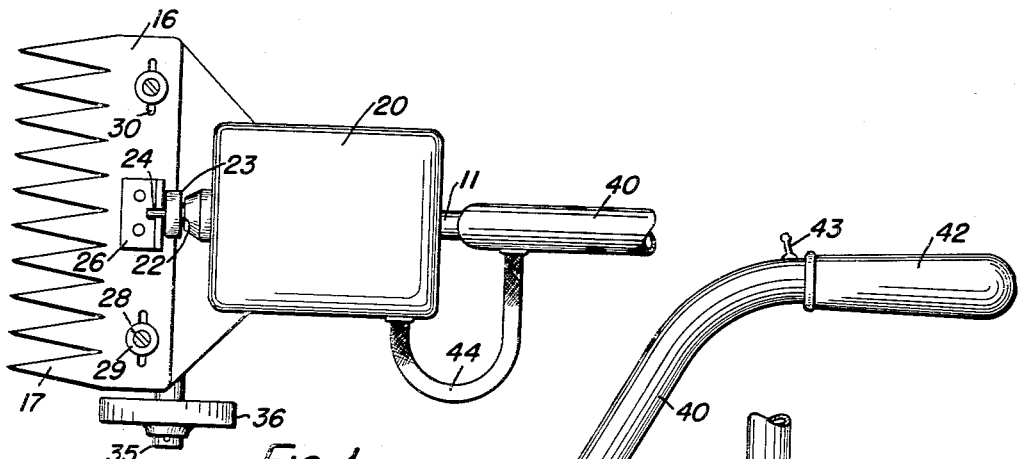
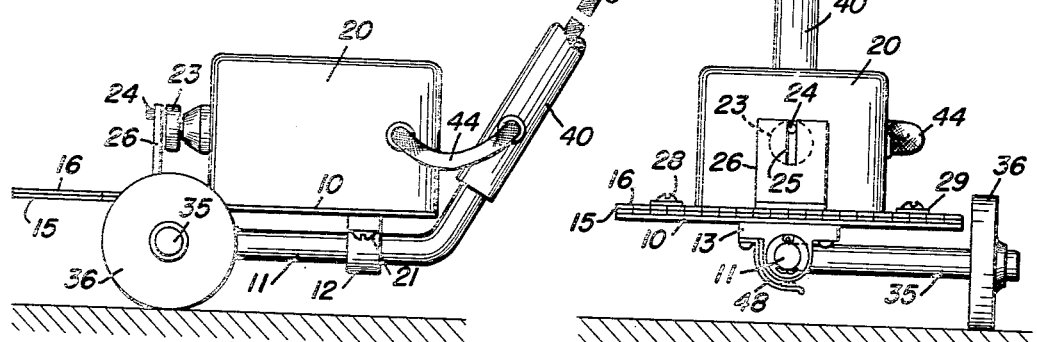
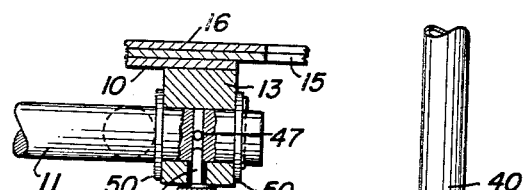
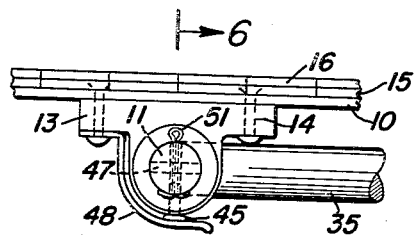
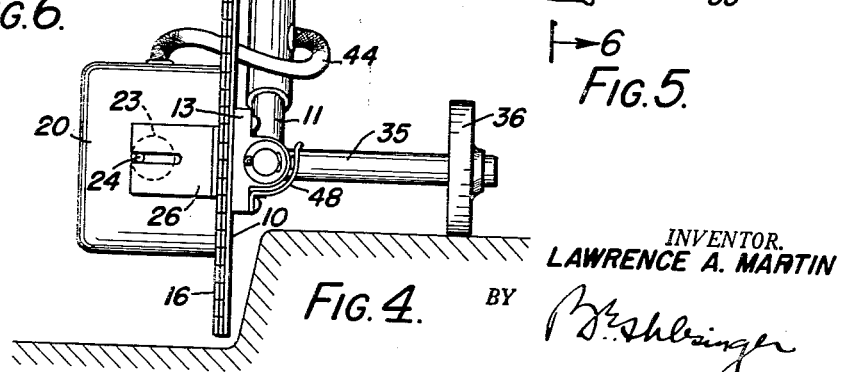
INVENTOR.
LAWRENCE A. MARTIN
BY
ATTORNEY ature and of the limits of the appended claims.

United States Patent Office 2,712,719
Patented July 12, 1955

2,712,719

LAWN EDGER

Lawrence Arther Martin, Rochester, N. Y.

Application January 9, 1953, Serial No. 330,471

3 Claims. (Cl. 56—26.5)

The present invention relates to apparatus for mowing and trimming lawns, and more particularly to a power-driven lawn edger.

One object of the present invention is to provide a lawn trimming apparatus, and particularly a lawn-edger, which will cut either horizontally or vertically so as to trim either a flat grass plot or the side of a terrace or of a gulley.

Another object of the invention is to provide apparatus of the character described which will be relatively light in weight and easy to handle.

Still another object of the invention is to provide apparatus of the character described which will be simple in construction and relatively inexpensive.

Other objects of the invention will be apparent hereinafter from the specification and from the recital of the appended claims.

In the drawing:

Fig. 1 is a fragmentary plan view of a lawn edger built according to one embodiment of this invention;

Fig. 2 is a fragmentary side elevation of this device;

Fig. 3 is a fragmentary front view of the edger shown in position for trimming a flat grass plot;

Fig. 4 is a front elevation of the edger shown in position for trimming the side of a gulley;

Fig. 5 is a fragmentary front elevation of the edger on a somewhat enlarged scale as compared with Fig. 3, and showing the means for locking the edger in either horizontal or vertical position; and Fig. 6 is a section at right angles to Fig. 5 taken on the line 6—6 of Fig. 5, looking in the direction of the arrows.

The device of this invention comprises a base 10 which is rotatably mounted upon a bar 11. Base 10 is secured on the bar 11 by spaced bearing blocks 12 and 13 (Figs. 2, 3 and 4) that are fastened to the base 10. Riveted to the base 10 by rivets 14 (Fig. 5), which serve simultaneously to secure the block 13 to the base, is a lower stationary serrated cutter 15 having a plurality of V-shaped cutting blades. Mounted to reciprocate relative to the stationary cutter 15, and to cooperate therewith, is a reciprocable cutter 16 having a plurality of V-shaped cutting blades 17. The reciprocable cutter 16 is adapted to be driven by a motor 20 that is secured to the base 10 and to the block 12 by screws 21. The armature shaft 22 of this motor has a crank plate 23 secured to it which carries a crank pin 24. The crank pin 24 engages in a slot 25 in an angle plate 26. The plate 26 is riveted to the reciprocable cutter 16. The cutter 16 is held on the cutter 15 by bolts 28 and washers 29. The bolts 28 pass through slots 30 in the upper cutter 16 and thread into the lower cutter 15.

Secured at one end in a transverse hole in the bar 11 is a shaft 35. This shaft is of reduced diameter at said one end to enter the hole in the bar 11; and it may be welded or otherwise secured in said hole against rotation relative to the bar 11. A wheel 36 is mounted on the other end of this shaft. This wheel serves to support the cutters and motor and to transport them over the ground.

The bar 11 is bent upwardly at its rear end beyond the rear of the motor 20 as shown in Fig. 2; and a tubular handle 40 is secured to the upwardly bent portion of the bar 11. A hand grip 42 is secured on the handle 40 so that the device can be manually supported and guided for operation. A manually-operated switch 43 is mounted in the handle 40 to control the motor 20. This is connected by an electrical cable 44 with the motor.

The base 10 and the parts supported thereby, including the cutters 15 and 16, the drive to the cutter 16, and the motor 20, are adjustable through an angle of 90° about the shaft 11 so as to position the cutters for cutting a level grass plot, as shown in Fig. 3, or for cutting the edge of a gulley or terrace, as shown in Fig. 4. In Fig. 3 the cutters are horizontal; and in Fig. 4 they are vertical. A spring clip 48, which is riveted to the base 10 and to the fixed cutter 15 by one of the rivets 14, serves to hold the base 10 and the cutters in any adjusted position. This spring clip has a pin welded or otherwise secured to it. Pin 45 serves to secure the base and cutters in any adjusted position. This pin is engageable selectively in one of the two holes 47 provided at right angles to one another in the bar 11 to hold the base and cutters in either horizontal or vertical position.

Washers or discs 50 which are disposed at opposite sides of the bearing block 13 serve to hold the base 10 and the parts supported thereby against axial movement on the bar 11. The cotter pin 51, which is secured in the bar 11 holds the outside washers 50 and the bearing block 13 in position.

The device is quite light in weight, easy to handle, relatively inexpensive, and can readily be guided by grasping the grip 42 of the handle 40. By adjusting the cutters to either horizontal or vertical position, as desired, and tripping the switch 43 to start the motor 20, and pushing on the handle 40 to roll the wheel over the surface of the lawn, the lawn can be trimmed with the cutters in either horizontal or vertical position. Since but a single supporting wheel 36 is provided and this is at one side of the pivotal axis of the cutters, the cutters can trim very close to a gulley or terrace as seen in Fig. 4. There is no second wheel as in an ordinary lawn mower, that might interfere with the positioning and operation of the cutting blades. Moreover, in trimming the side of a gulley or terrace the carriage portion of the device comprising shafts 11 and 35 and wheel 36 remains horizontal just as in trimming a horizontal patch of lawn. The operator does not have to strain himself or herself, therefore, in operating the device to trim a gulley or terrace.

Obviously the number of holes 47 can be multiplied, if desired, to permit holding the cutting blades in positions inclined to the vertical and horizontal.

While the invention has been described then in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. A lawn edger comprising a bar, an axle fixedly secured at one end to said bar to project laterally from the bar, a single supporting wheel mounted on the opposite end of said axle, a base member journaled on said bar for rotary adjustment thereon about an axis perpendicular to the axis of said axle, a motor mounted on said base member, and cutting means mounted on said base member and operatively connected to said motor to be driven thereby.

2. A lawn edger comprising a bar, an axle fixedly secured at one end to said bar to project laterally from the bar, a single supporting wheel mounted on the opposite end of said axle, a base member journaled on said bar for rotary adjustment thereon about an axis perpendicular to the axis of said axle, a motor mounted on said base member, cutting means mounted on said base member and operatively connected to said motor to be driven thereby, and a handle secured to said bar for manually propelling and guiding the edger.

3. A lawn edger comprising a bar, an axle fixedly secured at one end to said bar to project laterally from the bar, a supporting wheel mounted on the opposite end of said axle, a base member journaled on said bar for rotary adjustment thereon about an axis perpendicular to the axis of said axle, a motor mounted on said base member, a reciprocatory cutter mounted on said base member and operatively connected to said motor to be driven thereby, a handle secured to said bar for manually propelling and guiding the edger, and control means mounted on said handle for starting or stopping said motor.

References Cited in the file of this patent
UNITED STATES PATENTS

| | | |
|---|---|---|
| 2,351,460 | Shelton | June 13, 1944 |
| 2,587,393 | Shafer | Feb. 26, 1952 |
| 2,618,919 | Hutchens | Nov. 25, 1952 |